United States Patent
Wong et al.

(10) Patent No.: US 12,265,850 B2
(45) Date of Patent: Apr. 1, 2025

(54) RESERVATION MECHANISM FOR NODE WITH TOKEN CONSTRAINTS FOR PREVENTING NODE STARVATION IN A CIRCULAR TOPOLOGY NETWORK

(71) Applicant: INTERNATIONAL BUSINESS MACHINES CORPORATION, Armonk, NY (US)

(72) Inventors: Brendan M. Wong, Beaumont, TX (US); Bradley Donald Bingham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 17/446,418

(22) Filed: Aug. 30, 2021

(65) Prior Publication Data
US 2023/0064969 A1 Mar. 2, 2023

(51) Int. Cl.
*G06F 9/50* (2006.01)
(52) U.S. Cl.
CPC .......... *G06F 9/5027* (2013.01); *G06F 9/5077* (2013.01)
(58) Field of Classification Search
None
See application file for complete search history.

(56) References Cited

U.S. PATENT DOCUMENTS

| | | | | |
|---|---|---|---|---|
| 4,907,224 A | * | 3/1990 | Scoles | H04W 28/26 370/443 |
| 5,131,085 A | * | 7/1992 | Eikill | G06F 15/17 710/110 |

(Continued)

FOREIGN PATENT DOCUMENTS

| | | |
|---|---|---|
| EP | 0465027 A2 | 1/1992 |
| WO | 9103898 A1 | 3/1991 |

(Continued)

OTHER PUBLICATIONS

List of IBM Patents or Patent Applications Treated as Related, signed Aug. 30, 2022 (2 pgs).

(Continued)

*Primary Examiner* — Meng Ai T An
*Assistant Examiner* — Zujia Xu
(74) *Attorney, Agent, or Firm* — Eric W. Chesley

(57) ABSTRACT

A computer chip, a method, and computer program product for managing reservation between processing nodes with token constraints. The computer chip includes a plurality of processing nodes interconnected in an on-chip data transfer network configured in a circular topology. The processing nodes include a reservation mechanism that manages reservations made by the processing nodes. The reservation mechanism applies a reservation policy when a starvation condition is met on a processing node. The reservation policy separates the processing nodes into partition groups and dictates that a processing node may only send a reservation when their assigned partition group is active. Each of the processing nodes includes a buffer for storing messages that is divided into a pool of tokens and a pool of reservation tokens. The tokens are used for standard message transmission and the reservation tokens are reserved for token reservation requests received at a destination node.

20 Claims, 4 Drawing Sheets

(56) References Cited

U.S. PATENT DOCUMENTS

| | | |
|---|---|---|
| 5,185,737 A | 2/1993 | Nassehi |
| 5,908,468 A | 6/1999 | Hartmann |
| 5,953,510 A | 9/1999 | Herzl |
| 6,516,368 B1 | 2/2003 | Arimilli |
| 6,848,003 B1 | 1/2005 | Arimilli |
| 7,493,417 B2 | 2/2009 | Arimilli |
| 7,627,738 B2 | 12/2009 | Chung |
| 7,650,076 B2 | 1/2010 | Su |
| 7,747,771 B1 | 6/2010 | Shah |
| 7,751,426 B2 | 7/2010 | Hillyard |
| 7,870,337 B2 | 1/2011 | Bell, Jr. |
| 8,560,776 B2 | 10/2013 | Drapala |
| 9,178,827 B2 | 11/2015 | Kaplan |
| 9,665,294 B2 | 5/2017 | Povzner |
| 9,979,668 B2 | 5/2018 | Chen |
| 10,496,333 B2 | 12/2019 | Yang |
| 10,705,985 B1 | 7/2020 | Pollak |
| 10,764,185 B2 | 9/2020 | Marshall |
| 10,855,389 B1* | 12/2020 | Roggendorf .......... H04J 3/1694 |
| 11,593,134 B2 | 2/2023 | Wang |
| 2003/0033555 A1 | 2/2003 | Joyner |
| 2003/0202530 A1 | 10/2003 | Jenkins |
| 2003/0212812 A1 | 11/2003 | Wang |
| 2004/0210696 A1 | 10/2004 | Meyer |
| 2004/0230751 A1 | 11/2004 | Blake |
| 2005/0080941 A1 | 4/2005 | Moll |
| 2006/0045120 A1 | 3/2006 | Mattina |
| 2006/0104296 A1 | 5/2006 | Rodrigo |
| 2007/0297441 A1 | 12/2007 | Heil |
| 2008/0034054 A1* | 2/2008 | Stehley ............... H04L 67/1097 709/213 |
| 2008/0104245 A1* | 5/2008 | Romero ................ G06F 9/5083 711/147 |
| 2008/0159176 A1 | 7/2008 | Heil |
| 2009/0067428 A1 | 3/2009 | Balandin |
| 2009/0252172 A1* | 10/2009 | Hare ..................... H04L 47/822 370/400 |
| 2009/0327651 A1 | 12/2009 | Cargnoni et al. |
| 2010/0299734 A1 | 11/2010 | Lynch |
| 2012/0030448 A1 | 2/2012 | Lieske |
| 2012/0089984 A1* | 4/2012 | Adar ..................... G06F 9/4812 710/263 |
| 2012/0102561 A1 | 4/2012 | Butt |
| 2012/0159087 A1 | 6/2012 | Cox |
| 2014/0082238 A1 | 3/2014 | Ahmad |
| 2014/0185451 A1 | 7/2014 | Yip |
| 2014/0233575 A1 | 8/2014 | Xie |
| 2014/0280700 A1 | 9/2014 | Maitland |
| 2014/0372646 A1 | 12/2014 | Salisbury |
| 2015/0255126 A1* | 9/2015 | Khwa ................. G11C 13/0035 365/201 |
| 2016/0070593 A1* | 3/2016 | Harris ................ G06F 11/3409 718/106 |
| 2018/0324827 A1 | 11/2018 | Abraham |
| 2019/0018776 A1 | 1/2019 | Sato |
| 2019/0042486 A1 | 2/2019 | Guthrie |
| 2020/0042449 A1 | 2/2020 | Marino |
| 2020/0279250 A1 | 9/2020 | Good |
| 2020/0296083 A1 | 9/2020 | Chennuri |
| 2021/0037544 A1 | 2/2021 | Andrews |
| 2022/0308877 A1 | 9/2022 | Maiyuran |
| 2022/0342542 A1* | 10/2022 | Alkalay ............... G06F 12/0238 |
| 2023/0061266 A1 | 3/2023 | Marino et al. |
| 2023/0118362 A1 | 4/2023 | Marino et al. |

FOREIGN PATENT DOCUMENTS

| | | |
|---|---|---|
| WO | 2023/031015 A1 | 3/2023 |
| WO | 2023/031016 A1 | 3/2023 |

OTHER PUBLICATIONS

PCT/EP2022/073700 Form PC/ISA/206—Annex to Form PCT/ISA/206 Communication Relating to the Results of the Partial International Search. Mailed Nov. 30, 2022. 14 pages.
PCT/EP2022/073700 Notification of Transmittal of International Search Report and the Written Opinion of the International Searching Authority or the Declaration. Mailed Feb. 2, 2023. 23 pgs.
U.S. Appl. No. 17/446,427—Notice of References Cited, mailed Feb. 29, 2024 1 pg.
U.S. Appl. No. 18/067,790—Notice of References Cited, mailed Mar. 7, 2024 1pg.
PCT/EP2022/073698. International Search Report and Written Opinion mailed Nov. 9, 2022.
Bianchi, Giuseppe & Bonola, Marco & Bruschi, Valerio & Petrucci, Luca & Pontarelli, S.. (2017). Implementing a Per-Flow Token Bucket Using Open Packet Processor. 251-262. 10.1007/978-3-319-67639-5_18, https://www.researchgate.net/publication/319489224_Implementing_a_Per-Flow_Token_Bucket_Using_Open_Packet_Processor.
Chakrabarti, Ayan, Roch Gu'erin, Chenyang Lu and Jiangnan Liu. "Real-Time Edge Classification: Optimal Offloading under Token Bucket Constraints." ArXiv abs/2010.13737 (2020): n. pag., https://arxiv.org/abs/2010.13737.
Coté, E. A., & Manjikian, N. (2007). Implementation of coarse-grain coherence tracking support in ring-based multiprocessors. A thesis submitted to the Department of Electrical and Computer Engineering, Queen's University.
Disclosed Anonymously, "Fairness circuit for automic read-modify-write operations on multiprocessor systems," IP.com Electronic Publication Date: Nov. 6, 2018, IP.com Electronic Publication Date: Nov. 6, 2018, https://ip.com/IPCOM/000256121.
Disclosed Anonymously, "Reserved slots in PowerBus attached units for off-chip traffic to reduce link congestion due to retries," IP.com Electronic Publication Date: Jan. 30, 2015, IP.com No. IPCOM000240448D, https://priorart.ip.com/IPCOM/000240448.
Eynde, Jeremy Van Den. "Token Bucket-Based Throughput Constraining in Cross-Layer Schedulers." ArXiv.Org, Nov. 27, 2019, arxiv.org/abs/1911.12079.
Itamar Elhanany and Dan Sadot, A Contention-Free Tbit/sec Packet-Switching Architecture for ATM over WDM Networks, IEICE Trans. Commun., vol. E83-B, No. 2 Feb. 2000, https://www.researchgate.net/publication/2824295_A_Contention-Free_Tbitsec_Packet-Switching_Architecture_for_ATM_over_WDM_Networks.
Li, F.. "Local and Global QoS-aware Token Bucket Parameters Determination for Traffic Conditioning in 3rd Generation Wireless Networks." (2002), http://citeseerx.ist.psu.edu/viewdoc/summary?doi=10.1.1.385.8754.
List of IBM Patents or Patent Applications Treated as Related.
M. Hamdi, "ORMA: a high-performance MAC protocol for fiber-optic LANs/MANs," in IEEE Communications Magazine, vol. 35, No. 3, pp. 110-119, Mar. 1997, doi: 10.1109/35.581315.
Marty, M. R., & Hill, M. D. (Dec. 2006). Coherence ordering for ring-based chip multiprocessors. In 2006 39th Annual IEEE/ACM International Symposium on Microarchitecture (MICRO'06) (pp. 309-320). IEEE.
Orlando Moreira, Jacob Jan-David Mol, and Marco Bekooij. 2007. Online resource management in a multiprocessor with a network-on-chip. In <i>Proceedings of the 2007 ACM symposium on Applied computing</i> (21 i>SAC '07</i>). Association for Computing Machinery, New York, NY, USA, 1557-1564. DOI:https://doi.org/10.1145/1244002.1244335.
Vranesic, Z. G., Brown, S., Stumm, M., Caranci, S., Grbic, A., Grindley, R., . . . & Srbljic, S. (1995). The NUMAchine multiprocessor. University of Toronto. Computer Systems Research Institute.
Y. Peng, Q. Liu and P. Varman, "Scalable QoS for Distributed Storage Clusters using Dynamic Token Allocation," 2019 35th Symposium on Mass Storage Systems and Technologies (MSST), 2019, pp. 14-27, doi: 10.1109/MSST.2019.00-19, https://ieeexplore.ieee.org/document/8890120.
Wong et al., "Reservation Mechanic for Nodes with Phase Constraints", U.S. Appl. No. 17/446,427, filed Aug. 30, 2021, 25 Pages.

* cited by examiner

RESERVATION MECHANISM FOR NODE WITH TOKEN CONSTRAINTS FOR PREVENTING NODE STARVATION IN A CIRCULAR TOPOLOGY NETWORK

BACKGROUND

The present disclosure relates to semiconductor computer chips, and more specifically, to using an anti-starvation reservation mechanism to manage destination processing between processing nodes with token constraints.

Computer chips can include multiple processing nodes capable of performing a plurality of functions. The computer chips can utilize a plurality of buses configured in a circular, or ring, topology to connect multiple processing nodes on a single computer chip. The buses create communication pathways to allow the processing nodes to form a networked system on a single chip.

The processing nodes are devices such as a processor, an input/output ("I/O") controller, a memory, or a hybrid of devices capable of performing various tasks. A processor can be a central processing unit ("CPU"), a floating-point unit ("FPU"), an I/O controller, and the like. A memory can be in the form of random-access memory ("RAM"), read-only memory ("ROM"), hybrid memory, active memory, and the like. Hybrids can be task-specific, like an application-specific integrated circuit ("ASIC") or task-general.

SUMMARY

Embodiments of the present disclosure include a computer chip comprising a data transfer network that provides an anti-starvation reservation mechanism for processing nodes with token constraints. Token constraints dictate that a processing node requires a token to transmit a message to a destination node. The computer chip includes a plurality of processing nodes interconnected in an on-chip data transfer network configured in a circular topology. The processing nodes include a reservation mechanism that manages reservations made by the processing nodes. The reservation mechanism applies a reservation policy when a starvation condition is met on a processing node. The reservation policy separates the processing nodes into partition groups and dictates that a processing node may only send a reservation when their assigned partition group is active. An additional bus is used to increment a global partition counter indicating which partition group is active. Each of the processing nodes also includes a buffer for storing messages that is divided into a pool of tokens and a pool of reservation tokens. The tokens are used for standard message transmission and the reservation tokens are reserved for token reservation requests received at a destination node. The reservation tokens are distributed to processing nodes transmitting token reservation requests while their partition group is active.

Additional embodiments include a computer-implemented method of managing reservation between processing nodes with token constraints. The computer-implemented method includes assigning processing nodes to partition groups. A processing node of the processing nodes is assigned as the partition master that is assigned to increment a partition counter. The computer-implemented method also includes setting an active partition group of the partition groups by analyzing the partition counter. The active partition group is eligible to transmit token reservation requests based on a reservation policy and a processing node may only send one token reservation request during the active phase of their partition group. The computer-implemented method further includes receiving, by the partition master, a signal on the partition bus indicating an expiration of a time window for the active partition group, transmitting, by the partition master, an end signal to the processing nodes. The computer-implemented method also includes propagating, by each processing node of the processing nodes, the end signal when a token reservation pool is full, and receiving, by the partition master, the propagated end signal indicating a transition to a next active partition group. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
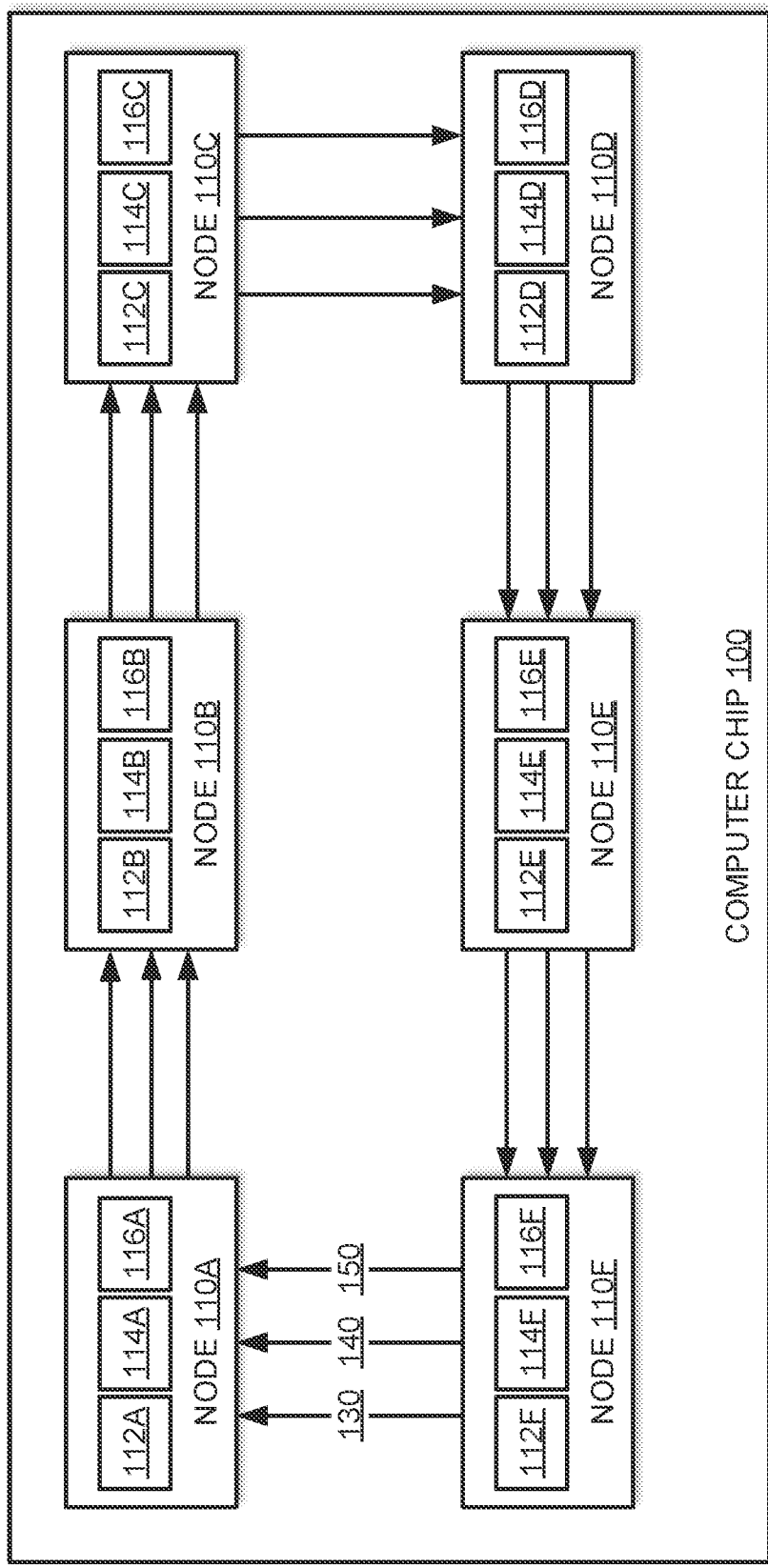
FIG. 1 is a block diagram illustrating a computer chip used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to semiconductor computer chips, and more specifically, to using an anti-starvation reservation mechanism to manage destination processing between processing nodes with token constraints. While the present disclosure is not necessarily limited to such applications, various aspects of the disclosure may be appreciated through a discussion of various examples using this context.

Computer Systems have traditionally comprised a system unit or housing, which include a plurality of electrical components comprising the computer system. A computer system typically includes a motherboard that is configured to hold the microprocessor and memory and the one or more buses used in the computer system. The motherboard typically comprises a plurality of computer chips or electrical components, including intelligent peripheral devices, bus controllers, processors, bus bridges, etc.

More recently, computer systems are evolving toward the integration of functions into a handful of computer chips. This coincides with the ability of chipmakers to place an increasingly large number of transistors on a single chip. For example, chip manufacturers can currently place up to ten million transistors on a single integrated circuit or monolithic substrate. It is anticipated that chip makers will be able to place one billion transistors on a single chip within several years. Thus, computer systems are evolving toward comprising a handful of computer chips, where each computer chip includes a plurality of functions. Integrating a plurality of modules or functions on a single computer chip requires an improved data transfer chip architecture. Also, due to the shorter distances and tighter integration of components on a chip, new data transfer architectures and techniques are necessary to take advantage of this environment.

A network on a chip, or network-on-chip ("NoC"), is a network-based communications subsystem on an integrated circuit between modules, or processing nodes, in a system on a chip. NoCs can span synchronous and asynchronous clock domains, known as clock domain crossing, or use unlocked asynchronous logic. NoCs can also support globally asynchronous, locally synchronous electronics architectures, allowing each processor core or functional unit on the system-on-chip to have its clock domain.

The topology of the NoCs can determine the physical layout and connections between nodes and channels. The topology also dictates the number of hops a message travels and a hop's channel length. For example, a ring topology with four nodes. Since the topology determines the number of paths between nodes, it can affect the network's traffic distribution and potential conflicts when nodes transmit messages.

However, limitations remain on networked processing nodes configured with token constraints in a circular topology network. These networks include token constraints that manage destination conflicts. Token constraints dictate that a processing node must consume a token to transmit a message to a destination node since tokens represent available buffer slots of the destination node. There is the potential of processing nodes becoming starved if upstream processing nodes consume a destination processing node's tokens before the tokens are able to propagate to a starved processing node. Additionally, reservations made by a starved processing node do not guarantee that the destination processing node will have buffer space in time to receive the message. Thus, processing nodes attempting to transmit messages to a destination processing node may be prevented or starved indefinitely if reservations are not managed appropriately.

Embodiments of the present disclosure may overcome the above, and other problems, by applying a reservation policy to nodes with token constraints. The nodes can be in a circular topology interconnected and coupled together by a bus. Each of the nodes includes a buffer for storing messages that is divided into a pool of tokens and a pool of reservation tokens. The tokens are used for standard message transmission and the reservation tokens are reserved for token reservation requests received at a destination node. The nodes also employ a reservation mechanism that enforces a reservation policy on each node. The reservation policy separates the processing nodes into partition groups and dictates that a processing node may only send a reservation when their assigned partition group is active. The policy also restricts the size of a partition group such that the number of nodes in a partition group is less than or equal to the number of reservation tokens on a node.

More specifically, embodiments of the present disclosure can manage node starvation by applying a reservation policy on reservation requests made by the processing nodes with token constraints. Since a node can only send data to a particular destination by consuming a token from the destination, the node must assert a reservation if it is unable to consume a token. The reservation policy placed on the processing nodes are based on the partition groups of those nodes. An additional partition bus is introduced that increments a partition counter internal to each processing node in the network. A window is created when the partition counter corresponds to a partition group number indicating the partition group is active. The nodes in that partition group are eligible to transmit token reservations while their partition group is active. The reservation policy also prevents nodes from transmitting more than one token reservation during the window of time. As such, the disclosure provides an anti-starvation reservation policy that prevents node starvation of processing nodes by restricting the use of reservation token requests to times when a processing node's partition group is active.

In some embodiments, a processing node within the network is assigned as a partition master. The designated partition master is configured to increment the partition. The partition master can drive the bus maintaining global partition counter. When the partition signal returns to the partition master, it can signal to the partition bus indicating that the global partition counter is to be incremented and that another partition group is set as active. Each processing node in a partition group is given an opportunity to transmit a token reservation request while the time window is active before the partition master increments the partition counter again.

FIG. 1 illustrates a computer chip 100 configured to utilize a plurality of buses configured in a circular topology to interconnect multiple processing nodes 110A-110F on a single computer chip 100. Each of the processing nodes 110 includes a buffer partitioned into a pool of tokens and a pool of reservation tokens. These pools are represented by token pools 112A-112F, and token reservation pools 114A-114F. Computer chip 100 also includes partition counters 116A-116F coupled to the processing nodes 110 for managing token reservation requests between the processing nodes 110. When reference is made to a component and its associated number, such as processing node 110 or token pools 112A-112F, that reference may refer to any of the components with that associated number, such as processing nodes 110A-110F or token pools 112A-112F, with or without an additionally associated letter. Each processing node 110 is connected via a communications bus 130, a token bus 140, and a partition bus 150, allowing for heterogeneous and homogenous processing node 110 types to form a networked system on the computer chip 100.

The processing nodes 110 are components of the computer chip 100 configured to perform operations. The processing nodes 110 can include, for example, a processor, an I/O controller, memory, or a hybrid of tasks (e.g., task-specific hybrid (ASIC) or task-general hybrid). A processor can be a CPU, FPU, or an I/O controller in various possible forms. A memory can be a RAM, ROM, hybrid memory, or active memory in any variety of possible forms. Hybrids can be task-specific, like an ASIC or task general. The processing nodes 110 also include buffers to store data transmitted by other processing nodes 110. The buffers are divided into buffer slots that are capable of storing the messages. Tokens are used to represent the number of buffer slots in the buffer. The totality of tokens a processing node 110 are divided into a token pool 114 and reservation token pool 114. The token pools 114 are utilized for standard message transmission between processing nodes 110. The reservation token pools 114 are utilized when the token pool 114 of a processing node 110 is exhausted and when a reservation request is received from another processing node 110.

The processing nodes 110 provide access control to their buffers via the tokens. The processing nodes 110 can transmit their available tokens onto the token bus 140 to inform other processing nodes 110 of the space available in their respective buffers. When another processing node 110 has a message to send, it can seize a token and send a message. The processing node 110 that seizes a token can change the bit on the token bus 140 representing the token to '0' to indicate that the token has been consumed. When a processing node 110 is unable to consume a token within a bounded amount of time, the processing node 110 can transmit a token reservation request to a destination node 110 requesting a buffer slot.

The processing nodes 110 are further configured to transmit token reservation requests to a destination processing node 110 when no token is from the destination processing node 110. When the destination processing node 110 receives a reservation request, it can transmit a reservation token stored in the reservation token pool 114 back to the source processing node 110. A reservation token is guaranteed because a reservation policy dictates that a partition group size must be less than or equal to the number of reservation tokens stored by a processing node 110. Once the reservation token is received, the source processing node 110 can transmit the message.

For example, the processing node 110A has depleted its tokens allocated in its token pool 112A. Processing node 110B wants to send a message to processing node 110A, but no token is present on the token bus. In order to send the message, the processing node 110B transmits a token reservation request to the processing node 110A. Upon receiving the token reservation request, the processing node 110A transmits a reservation token from its reservation token pool 114A. The processing node 110B can use the reservation token to then transmit its message to processing node 110A.

The processing nodes 110 are organized into different partition groupings. The number of partition groups can be predetermined upon the configuration of the network and can be based on the number of processing nodes 110 in the network. For example, a network of eight processing nodes 110 can be configured to have four partition groupings with two processing nodes 110 assigned per partition group. It should be noted that any number of partition groupings can be used and is not limited by the previous example.

Additionally, the number of processing nodes 110 in each group can be less than or equal to the number of reservation tokens in the reservation pool 114 of a processing node 110. For example, if a processing node 110 has two reservation tokens in its token reservation pool 114, then each partition grouping size would consist of two processing nodes 110.

The processing nodes 110 are further configured to maintain a partition counter 116. The partition counter 116 can be set by the partition bus 150. The partition counter 116 is used as an indicator to the processing nodes 110, indicating which partition grouping is permitted to request a reservation token from another processing node 110. For example, when the partition counter 116 is at '2', then the processing nodes 110 in partition group '2' are permitted to request reservation tokens. Additionally, the partition counter 116 can be considered a global counter within the network, where all of the processing nodes 110 in the network maintain the same count in their internal partition counters 116.

A processing node 110 within the network can be assigned as a partition master. The designated partition master is configured to increment the partition counter using the partition bus 150. The partition master can drive a partition signal as '1' on the partition bus 150 that propagates around the network ring. When the partition signal reaches a processing node 110, and the token reservation pool 114 of that processing node 110 is full, then that processing node 110 can continue to propagate the partition signal as '1'. However, if the processing node 110 with the partition signal does not have a full token reservation pool 114, then that processing node 110 keeps the partition signal low to interrupt the signal until its token reservation pool becomes refilled. The partition signal does not propagate back to the partition master until all token reservation pools 114 are full. In order to prevent additional starvation scenarios, reservation requests are halted one lap number of cycles prior to the partition master signaling an increment to the partition counter.

When the partition signal returns to the partition master, it can drive the partition signal to '0', presenting a negative edge that can be used as an indicator to the other processing nodes 110 in the network to increment their partition counters. When a negative edge is presented to the subsequent processing node 110, their partition counter is incremented until all counters are incremented.

The communications bus 130, the token bus 140, and the end partition bus 150 are components of the computer chip 100 configured to form part of a data transfer network utilizing multiple circular topologies for interconnecting the plurality of processing nodes 110A-110F on the computer chip 100 in an on-chip network. The communications bus 130 is further configured to provide an electrical path for data communications between the plurality of processing nodes 110 comprised on the computer chip 100. It is noted that although the embodiment of FIGS. 1 and 2 include three buses 130, 140, and 150, but a greater number of buses may be included, as desired.

The communication bus 130, the token bus 140, and the end partition bus 150 may be unidirectional, that is, only transmitting data in one direction. The buses 130 and 140 may also be configured to transfer data in two directions. The buses 130, 140, and 150 can also include addressing and control lines in addition to data lines. Other special function lines may also be included in buses 130, 140, and 150 as desired. When a processing node 110 transmits a token reservation, the reservation forces a slot, or "bubble", onto the communications bus 130 such that when the slot gets back to the processing node 110 that made the reservation request, that processing node 110 can then transmit a message in that slot.

In the embodiment of FIG. 1, the computer chip 100 includes, moving in a clockwise fashion starting at the upper left, the processing nodes 110 coupled to the buses 130, 140, and 150 in a circular topology. Each processing node 110 is further coupled to a processing node assigned as a partition master, collectively coupled to the buses 130, 140, and 150 in a circular topology. It should be noted that other couplings for the processing nodes 110 are possible, such as another processing node 110 or to communication ports.

It is noted that FIG. 1 is intended to depict the major representative components of a computer chip 100. In some embodiments, however, individual components may have greater or lesser complexity than as represented in FIG. 1, components other than or in addition to those shown in FIG. 1 may be present, and the number, type, and configuration of such components may vary. While shown as only including four processing nodes 110, it should be noted that the computer chip 100 can include any number of processing nodes 110, configured in a circular topology.

Figure 2:
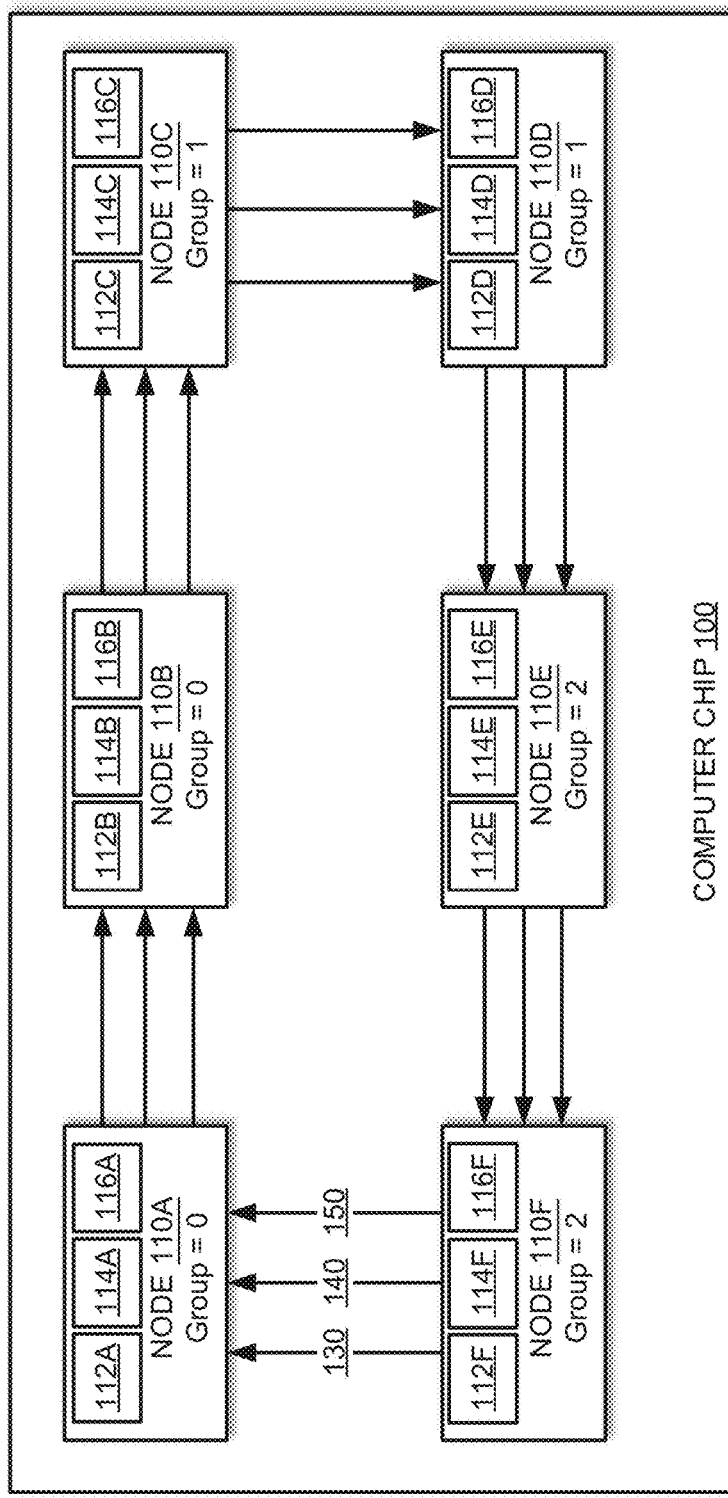
FIG. 2 is a block diagram illustrating a computer chip utilizing token constraints and used by one or more embodiments of the present disclosure.

FIG. 2 is a block diagram illustrating an exemplary implementation 200 of a computer chip 100 utilizing a reservation policy imposed on the processing nodes 110. Implementation 200 includes a table 210 illustrating the reservation process between the processing nodes 110 making reservations that imposed by the reservation policy.

In this exemplary implementation 200, each processing node 110 is a token node. However, it should be noted that networks can include processing nodes 110 that do not utilize token reservations and that have other configurations for handling messages. In the example, and for illustrative purposes only, processing node 110A is the partition master and is assigned to drive a partition signal onto the end partition bus 150. Additionally, processing nodes 110A and 110B are assigned to partition group '0', processing nodes 110C and 110D are assigned to partition group '1', and processing nodes 110E and 110F are assigned to partition group '2'.

Additionally, in this exemplary implementation, the rows of table 210 includes a cycle indicating a cycle count, a token row indicating a token signal being transmitted by processing node 110F, a communications bus indicating which processing node 110 is consuming a token to transmit a message, a token reservation request signal indicating the processing nodes 110 that transmit a token reservation, and a partition counter indicating the partition count the processing nodes 110 are in. It should also be noted that while token row is illustrated from the perspective of processing node 110F, the communication bus row indicates which processing node 110 will eventually consume the token in the same column. Additionally, the reservation cycle is taken from the perspective of processing node 110C.

On cycle 1, node 110A consumes a token from processing node 110F in order to transmit a message to processing node 110F. By consuming the token, processing node 110A is assured a buffer slot for the message it is transmitting. This process is repeated on cycles 2, 3, 5, and 9. Since processing node 110A has been consuming all of the tokens distributed by processing node 110F, processing node 110C is unable to consume a token to transmit a message to processing node 110F.

On cycle 10, processing node 110C transmits a token reservation to processing node 110F. It was unable to consume a token but still requires transmission of a message to processing node 110F. Processing node 110C is able to transmit a token reservation because the partition count is at '1' and processing node 110C is in partition group '1'. The time window when a processing node's 110 partition group matches the current partition count allows the processing node 110 to transmit a token reservation if needed. The processing node 110C, however, will not be able to transmit another token reservation request in this time window. The processing node 110C will have to wait until the time window cycles back around, and the partition count is set at '1' again.

On cycle 13, the processing node 110F receives the token reservation, it can transmit a reservation token from its reservation pool 114 on the token bus 140. On cycle 16, node 110C consumes the reservation token in order to transmit its message to processing node 110F. By consuming the token, processing node 110C is assured of a buffer slot reserved by the reservation token.

Figure 3:
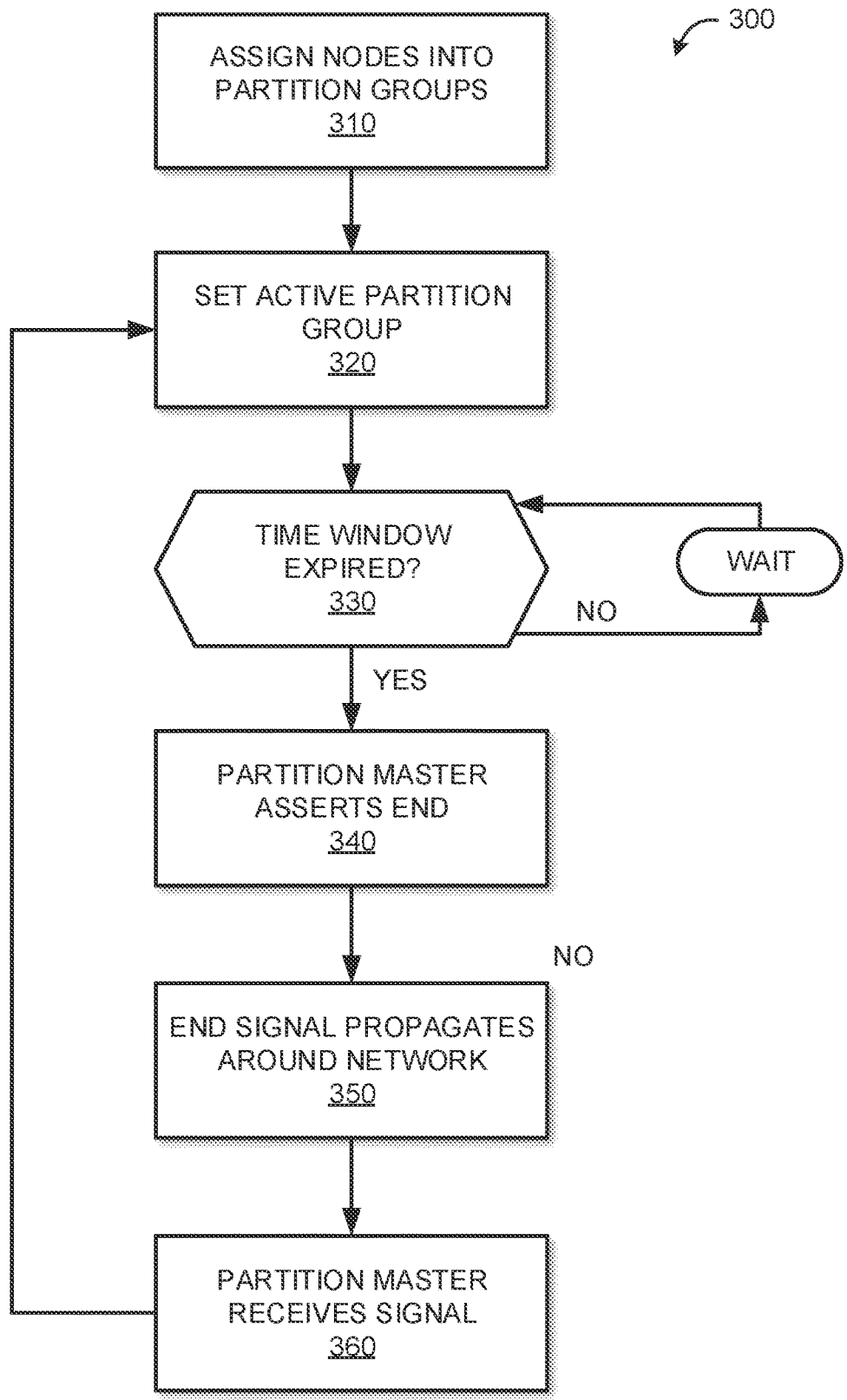
FIG. 3 is a flow diagram illustrating a process of managing reservations between processing nodes with token constraints and performed in accordance with embodiments of the present disclosure.

FIG. 3 is a flow diagram illustrating a process 300 of managing token reservation requests of processing nodes configured in a ring topology with token constraints, in accordance with embodiments of the present disclosure. The process 300 may be performed by hardware, firmware, software executing on a processor, or a combination thereof. For example, any or all the steps of the process 300 may be performed by one or more processors embedded in a computing device. The processing nodes are assigned into partition groups. This is illustrated at step 310. The number of partition groups can be predetermined upon the configuration of the network and can be based on the number of processing nodes 110 in the network. For example, a network with twenty processing nodes 110 can have five partition groups with four processing nodes 110 in each group. In some embodiments, the partition groups are determined by the reservation pool sizes of the processing nodes 110. The number of processing nodes 110 in each group can be less than or equal to the number of reservation tokens in the reservation pool 114 of a processing node 110. For example, if the reservation pools 114 of the processing nodes 110 consists of four tokens, and if the network includes twenty processing nodes 110, then the number of partition groups would be five.

A processing node assigned as a partition master sets a partition counter via a partition bus. The partition counter indicates an active partition group. This is illustrated at step 320. A window is created when the partition counter corresponds to a partition group number indicating the partition group is active. A reservation policy dictates that nodes in an active partition group are eligible to transmit token reservations requests to destination processing nodes. The reservation policy also prevents nodes from transmitting more than one token reservation request during the time window. Token reservation requests are made when a processing node is to consume a token within a bounded amount of time, whereby a starvation condition is met. Additionally, a reservation token is guaranteed because the reservation policy also dictates that a partition group size must be less than or equal to the number of reservation tokens stored by a processing node.

The time window expires when the partition signal returns to the partition master. This is illustrated at step 330. If the partition master has not received the signal, then the active partition group is still eligible to transmit token reservation requests. However, if the partition signal has returned to the partition master, then the processing nodes in the active group are halted from requesting token reservations. In order to prevent additional starvation scenarios, reservation requests are halted one lap number of cycles prior to the partition master signaling an increment to the partition counter.

The partition master asserts an end signal on the partition bus. This is illustrated at step 340. When the partition signal reaches a processing node 110, and the token reservation pool 114 of that processing node 110 is full, then that processing node 110 can continue to propagate the partition signal. This is illustrated at step 350. However, if the processing node 110 with the partition signal does not have a full token reservation pool 114, then that processing node 110 keeps the partition signal low to interrupt the signal until its token reservation pool becomes refilled. The partition signal does not propagate back to the partition master until all token reservation pools 114 are full.

When the partition signal returns to the partition master, it can drive the partition signal to '0', presenting a negative edge. This is illustrated at step 360. The negative edge can be used as an indicator to the other processing nodes in the network to increment their partition counters. When a negative edge is presented to the subsequent processing node 110, their partition counter is incremented until all counters in the network are incremented. Once incremented, the process 300 proceeds to the next active partition group.

Figure 4:
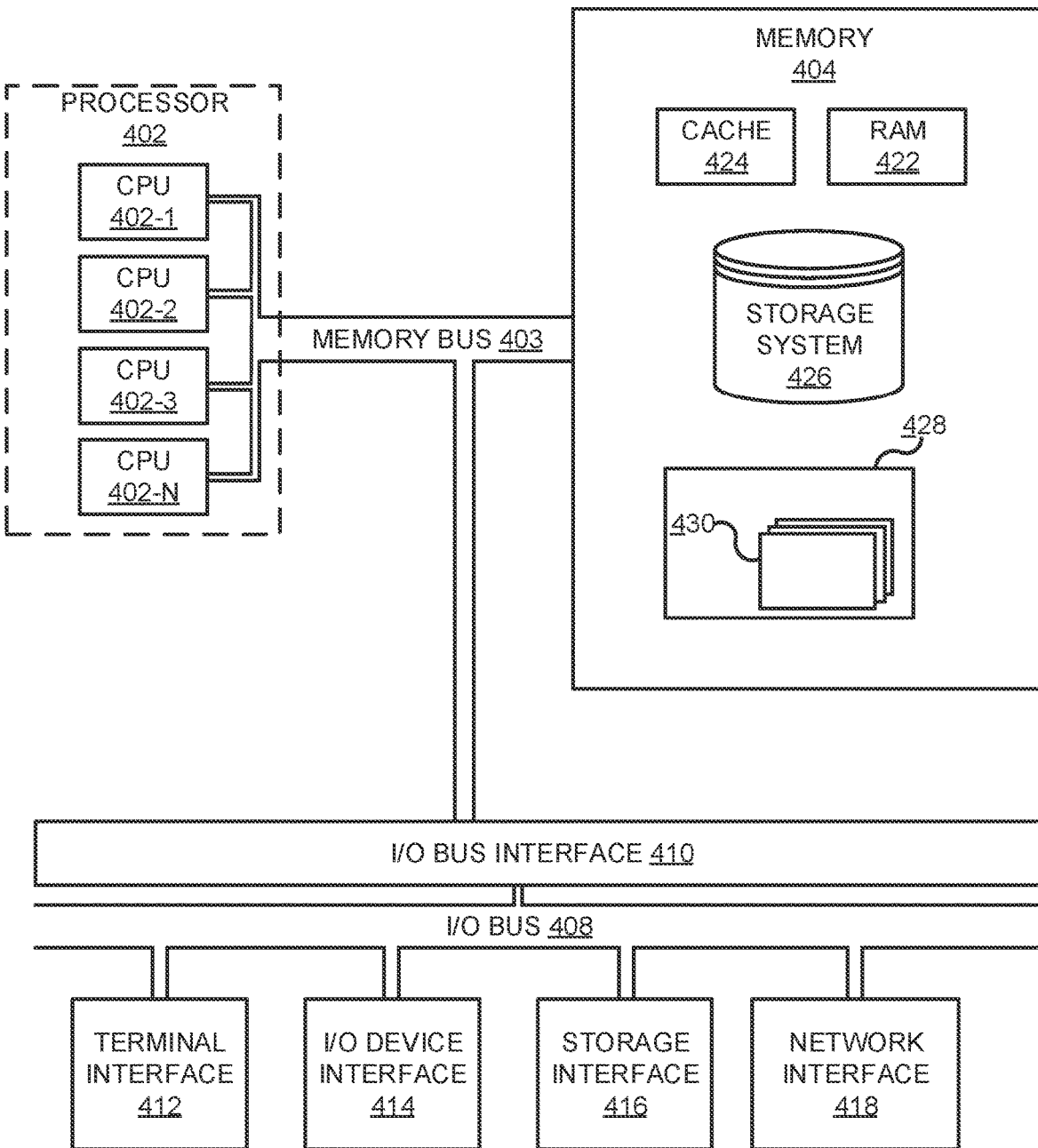
FIG. 4 is a high-level block diagram illustrating an example computer system that may be used in implementing one or more of the methods, tools, and modules, and any related functions, described herein in which the disclosure may be implemented.

Referring now to FIG. 4, shown is a high-level block diagram of an example computer system 400 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 400 may comprise one or more processors 402, a memory 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface 410.

The computer system 400 may contain one or more general-purpose programmable central processing units (CPUs) 402-1, 402-2, 402-3, and 402-N, herein generically referred to as the processor 402. In some embodiments, the computer system 400 may contain multiple processors typical of a relatively large system; however, in other embodiments, the computer system 400 may alternatively be a single CPU system. Each processor 402 may execute instructions stored in the memory 404 and may include one or more levels of onboard cache.

The memory 404 may include computer system readable media in the form of volatile memory, such as random-access memory (RAM) 422 or cache memory 424. Computer system 400 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the processors 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units, multiple I/O buses, or both. Further, while multiple I/O interface units are shown, which separate the I/O bus 408 from various communications paths running to the various I/O devices, in other embodiments, some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the major representative components of an exemplary computer system 400. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 (e.g., the computer chip 100), may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

The present disclosure may be a system, a method, and/or a computer program product at any possible technical detail level of integration. The computer program product may include a computer-readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer chip comprising a plurality of processing nodes configured with token constraints in a circular topology network, the circular topology network comprising:
   a plurality of buses configured on the computer chip, wherein the buses include an end partition bus used to increment a partition counter, the partition counter indicating an identifier for an active partition group that is allowed to make token reservation requests as part of an anti-starvation reservation policy to avoid node starvation of the processing nodes with the token constraints;
   the plurality of processing nodes assigned to a plurality of partition groups, wherein the plurality of processing nodes are coupled to the buses and are operable to manage reservation requests using the anti-starvation reservation policy which dictates that only the active partition group of the plurality of partition groups can make token reservation requests for a reservation token within a time window that allows the active partition group to send a message using an additional buffer slot in order to avoid node starvation;
   a token pool stored within each processing node of the plurality of processing nodes, wherein tokens in the token pool correspond to buffer slots available on said each processing node of the plurality of processing nodes; and
   a reservation token pool within each processing node of the plurality of processing nodes, wherein the reservation tokens in the reservation token pool correspond to additional buffer slots available on each processing node of the plurality of processing nodes, wherein the plurality of processing nodes are restricted from requesting the reservation tokens based on the token constraints, and wherein at least one processing node in the active partition group makes a token reservation request for an additional buffer slot while the time window is active without node starvation in response to the identifier of the partition counter indicating that the active partition group is allowed to make the token reservation requests.

2. The computer chip of claim 1, wherein the anti-starvation reservation policy separates the plurality of processing nodes into the plurality of partition groups.

3. The computer chip of claim 2, wherein the partition group is active during the time window when the partition group and the partition counter are equivalent.

4. The computer chip of claim 3, wherein the anti-starvation reservation policy dictates that a processing node within the active partition group is permitted to make one token reservation request within the time window.

5. The computer chip of claim 1, wherein one of the processing nodes is assigned as a partition master configured to increment the partition counter via the end partition bus.

6. The computer chip of claim 5, wherein the partition master signals an increment to the partition counter via the end partition bus when the reservation token pool in each of the plurality of processing nodes is full and a signal in the end partition bus is received by the partition master.

7. The computer chip of claim 5, wherein a number of the processing nodes within a partition group of the plurality of partition groups is equal to a number of the reservation tokens stored by the reservation token pool.

8. The computer chip of claim 1, wherein each processing node of the plurality of processing nodes is configured to interrupt a signal of the end partition bus until the reservation token pool of each processing node of the plurality of processing nodes is full in a processing node holding the signal of the end partition bus.

9. The computer chip of claim 1, wherein the processing nodes are configured to provide reservation tokens for token reservation requests transmitted from one of the processing nodes.

10. The computer chip of claim 1, wherein the processing nodes are configured to maintain an internal partition counter that is incremented based on a signal provided by the end partition bus.

11. A computer-implemented method of managing reservations between a plurality of processing nodes with token constraints to avoid node starvation, the computer-implemented method comprising:
   providing a token pool within each processing node of the plurality of processing nodes;
   providing a token reservation pool within each processing node of the plurality of processing nodes, wherein reservation tokens in the token reservation pool correspond to additional buffer slots available on each processing node of the plurality of processing nodes, wherein the plurality of processing nodes are restricted from requesting the reservation tokens based on the token constraints;

organizing the plurality of processing nodes into a plurality of partition groups;

assigning one processing node of the plurality of processing nodes as a partition master;

setting an active partition group of the plurality of partition groups and a time window by analyzing a partition counter incremented by a partition bus, the partition counter indicating an identifier for an active partition group that is allowed to make token reservation requests within the time window as part of an anti-starvation reservation policy to avoid node starvation of the processing nodes with the token constraints, wherein the active partition group is eligible to transmit token reservation requests based on the anti-starvation reservation policy which specifies that only the active partition group is allowed to make a reservation request for a reservation token that allows the active partition group to send a message within the time window using an additional buffer slot to avoid node starvation;

reserving, by at least one processing node in the active partition group, the additional buffer slot while the time window is active without node starvation;

receiving, by the partition master, a signal on the partition bus indicating an expiration of the time window for the active partition group;

transmitting, by the partition master, an end signal to the processing nodes;

propagating, by each processing node of the plurality of processing nodes, the end signal when the token reservation pool within each processing node of the plurality of processing nodes is full; and receiving, by the partition master, the propagated end signal indicating a transition to a next active partition group.

12. The computer-implemented method of claim 11, wherein the anti-starvation reservation policy separates the plurality of processing nodes into the plurality of partition groups.

13. The computer-implemented method of claim 12, wherein the active partition group is active during the time window when the partition group and the partition counter are equivalent.

14. The computer-implemented method of claim 13, wherein the anti-starvation reservation policy dictates that a processing node within the active partition group is permitted to make one token reservation request within the time window.

15. The computer-implemented method of claim 11, wherein the plurality of processing nodes are configured to provide reservation tokens for token reservation requests transmitted from one of the processing nodes.

16. The computer-implemented method of claim 15, wherein a number of the processing nodes within a partition group of the plurality of partition groups is equal to a number of the reservation tokens stored by the token reservation pool of the processing nodes within the partition group.

17. A computer program product including computer readable storage media of managing destination conflicts between a plurality of processing nodes using token constraints to avoid node starvation, having computer executable instructions that when executed by at least one computer cause the at least one computer to perform operations comprising:

providing a token pool within each processing node of the plurality of processing nodes;

providing a token reservation pool within each processing node of the plurality of processing nodes, wherein reservation tokens in the token reservation pool correspond to additional buffer slots available on each processing node of the plurality of processing nodes, wherein the plurality of processing nodes is restricted from requesting the reservation tokens based on the token constraints;

organizing the plurality of processing nodes into a plurality of partition groups;

assigning one processing node of the plurality of processing nodes as a partition master;

setting an active partition group of the plurality of partition groups and a time window by analyzing a partition counter incremented by a partition bus, the partition counter indicating an identifier for an active partition group that is allowed to make token reservation requests within the time window as part of an anti-starvation reservation policy to avoid node starvation of the processing nodes with the token constraints, wherein the active partition group is eligible to transmit token reservation requests based on the anti-starvation reservation policy which specifies that only the active partition group is allowed to make a reservation request for a reservation token that allows the active partition group to send a message within the time window using an additional buffer slot to avoid node starvation;

reserving, by at least one processing node in the active partition group, the additional buffer slot while the time window is active without node starvation;

receiving, by the partition master, a signal on the partition bus indicating an expiration of the time window for the active partition group;

transmitting, by the partition master, an end signal to the processing nodes;

propagating, by each processing node of the plurality of processing nodes, the end signal when the token reservation pool within said each processing node of the plurality of processing nodes is full; and receiving, by the partition master, the propagated end signal indicating a transition to a next active partition group.

18. The computer program product of claim 17, wherein the anti-starvation reservation policy separates the plurality of processing nodes into the plurality of partition groups.

19. The computer program product of claim 18, wherein the active partition group is active during the time window when the partition group and the partition counter are equivalent.

20. The computer program product of claim 19, wherein the anti-starvation reservation policy dictates that a processing node within the active partition group is permitted to make one token reservation request within the time window.

* * * * *